United States Patent
Rofougaran (10) Patent No.: US 8,284,822 B2
(45) Date of Patent: Oct. 9, 2012

(54) METHOD AND SYSTEM FOR UTILIZING DIRECT DIGITAL FREQUENCY SYNTHESIS TO PROCESS SIGNALS IN MULTI-BAND APPLICATIONS

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 862 days.

(21) Appl. No.: 11/679,626

(22) Filed: Feb. 27, 2007

(65) Prior Publication Data

US 2008/0205560 A1 Aug. 28, 2008

(51) Int. Cl.
H04B 1/38 (2006.01)

(52) U.S. Cl. ......... 375/219; 375/340; 375/260; 455/133

(58) Field of Classification Search .............. 375/340, 375/219; 455/133
See application file for complete search history.

(56) References Cited

U.S. PATENT DOCUMENTS

| | | | |
|---|---|---|---|
| 3,908,181 A * | 9/1975 | Shigaki et al. ............. 341/143 |
| 4,949,044 A * | 8/1990 | Starewicz et al. ........... 324/320 |
| 5,031,131 A * | 7/1991 | Mikos ....................... 708/276 |
| 5,184,093 A * | 2/1993 | Itoh et al. ................... 331/25 |
| 5,598,437 A | 1/1997 | Gourse |
| 5,598,440 A * | 1/1997 | Domagala ................... 375/329 |
| 5,710,517 A * | 1/1998 | Meyer ........................ 327/163 |
| 5,742,208 A * | 4/1998 | Blazo .......................... 331/23 |
| 5,801,589 A * | 9/1998 | Tajima et al. ............... 331/1 R |
| 5,834,985 A * | 11/1998 | Sundegard ................... 332/100 |
| 6,060,917 A * | 5/2000 | Saul .......................... 327/107 |
| 6,392,494 B2 * | 5/2002 | Takeyabu et al. ............. 331/11 |
| 6,404,293 B1 * | 6/2002 | Darabi et al. ................. 331/37 |
| 6,429,693 B1 * | 8/2002 | Staszewski et al. ........... 327/12 |
| 6,483,388 B2 * | 11/2002 | Khan ......................... 331/18 |
| 6,738,601 B1 * | 5/2004 | Rofougaran et al. ........ 455/66.1 |
| 6,744,839 B1 * | 6/2004 | Tada et al. ................... 375/376 |
| 6,822,595 B1 * | 11/2004 | Robinson .................... 341/144 |
| 6,924,711 B2 * | 8/2005 | Liu .......................... 332/159 |
| 6,950,957 B1 * | 9/2005 | O'Leary ..................... 713/401 |
| 7,006,589 B2 * | 2/2006 | Staszewski et al. .......... 375/371 |
| 7,095,819 B2 * | 8/2006 | Bellaouar et al. ............ 375/376 |
| 7,123,664 B2 * | 10/2006 | Matero ....................... 375/295 |
| 7,142,063 B2 * | 11/2006 | Grewing et al. .............. 331/16 |
| 7,203,262 B2 * | 4/2007 | Moy et al. ................... 375/376 |
| 7,224,302 B2 * | 5/2007 | Dornbusch .................. 341/143 |
| 7,233,629 B2 * | 6/2007 | Auranen ..................... 375/316 |
| 7,289,005 B2 * | 10/2007 | Puma ........................ 332/145 |
| 7,302,235 B2 * | 11/2007 | Paatelma et al. .............. 455/68 |
| 7,319,849 B2 * | 1/2008 | Womac ..................... 455/180.1 |
| 7,366,481 B2 * | 4/2008 | Okada et al. ................ 455/126 |
| 7,394,418 B2 * | 7/2008 | Eikenbroek ................. 341/143 |
| 7,397,868 B2 * | 7/2008 | Shi et al. .................... 375/316 |

(Continued)

Primary Examiner — David Ometz
Assistant Examiner — Santiago Garcia
(74) Attorney, Agent, or Firm — Farjami & Farjami LLP (57) ABSTRACT

Aspects of a method and system for utilizing direct digital frequency synthesis in multi-band applications are provided. A direct digital frequency synthesizer integrated in a multi-band wireless receiver chip may be enabled to generate one or more reference signals that may be utilized to down-convert VHF, UHF and L-band signals to baseband signals. The direct digital frequency synthesizer may further generate one or more reference signals, which may be utilized to calibrate one or more circuits that process received VHF, UHF, and L-band signals. In this regard, the signals generated by the direct digital frequency synthesizer may be utilized to calibrate one or more LNAs in a receive processing chain of the chip and/or one or more filters that may be utilized to process baseband signals.

24 Claims, 4 Drawing Sheets

U.S. PATENT DOCUMENTS

| | | | |
|---|---|---|---|
| 7,432,770 B2 * | 10/2008 | Shigemori et al. | 331/77 |
| 7,436,920 B2 * | 10/2008 | Shachar et al. | 375/376 |
| 7,440,987 B1 | 10/2008 | Song | |
| 7,466,195 B2 * | 12/2008 | Drogi et al. | 330/136 |
| 7,480,344 B2 * | 1/2009 | Zolfaghari et al. | 375/297 |
| 7,526,055 B2 * | 4/2009 | Lee | 375/376 |
| 7,528,638 B2 * | 5/2009 | Lee et al. | 327/158 |
| 7,532,989 B1 * | 5/2009 | Torosyan | 702/66 |
| 7,535,311 B2 * | 5/2009 | Nergis | 332/127 |
| 7,557,619 B1 * | 7/2009 | Dick et al. | 327/106 |
| 7,593,698 B1 * | 9/2009 | Johnson et al. | 455/102 |
| 7,599,418 B2 * | 10/2009 | Ahmed | 375/135 |
| 2002/0055337 A1 * | 5/2002 | Persico et al. | 455/112 |
| 2002/0150169 A1 * | 10/2002 | Kishi | 375/295 |
| 2002/0159555 A1 * | 10/2002 | Staszewski et al. | 375/376 |
| 2003/0001681 A1 * | 1/2003 | Asikainen et al. | 331/18 |
| 2003/0045263 A1 * | 3/2003 | Wakayama et al. | 455/323 |
| 2003/0141932 A1 * | 7/2003 | Toyota et al. | 330/285 |
| 2004/0052312 A1 * | 3/2004 | Matero | 375/295 |
| 2004/0097210 A1 * | 5/2004 | Sato | 455/260 |
| 2004/0136441 A1 * | 7/2004 | Ryu et al. | 375/135 |
| 2004/0184559 A1 | 9/2004 | Ballantyne | |
| 2005/0111575 A1 * | 5/2005 | Taler et al. | 375/297 |
| 2006/0026657 A1 * | 2/2006 | Kuhlmann et al. | 725/100 |
| 2006/0125687 A1 | 6/2006 | Greeley | |
| 2006/0227898 A1 * | 10/2006 | Gibson et al. | 375/316 |
| 2006/0270346 A1 * | 11/2006 | Ibrahim et al. | 455/41.2 |
| 2006/0276149 A1 * | 12/2006 | Womac et al. | 455/133 |
| 2007/0064843 A1 | 3/2007 | Vavelidis et al. | |
| 2007/0066272 A1 | 3/2007 | Vassiliou et al. | |
| 2007/0091988 A1 | 4/2007 | Sadri et al. | |
| 2007/0207759 A1 | 9/2007 | Vavelidis et al. | |
| 2007/0207760 A1 | 9/2007 | Kavadias et al. | |
| 2007/0275679 A1 * | 11/2007 | Gibson et al. | 455/179.1 |
| 2007/0286322 A1 * | 12/2007 | Uchino et al. | 375/376 |
| 2008/0081630 A1 * | 4/2008 | Rofougaran | 455/452.1 |
| 2008/0103649 A1 * | 5/2008 | Shen et al. | 701/23 |
| 2008/0122496 A1 * | 5/2008 | Wagner | 327/107 |
| 2008/0132195 A1 * | 6/2008 | Maxim et al. | 455/334 |
| 2008/0176527 A1 * | 7/2008 | Womac | 455/180.2 |
| 2008/0181336 A1 * | 7/2008 | Maxim | 375/340 |
| 2008/0204150 A1 * | 8/2008 | Rofougaran | 331/10 |
| 2008/0205542 A1 * | 8/2008 | Rofougaran | 375/271 |
| 2008/0205549 A1 * | 8/2008 | Rofougaran | 375/299 |
| 2008/0205550 A1 * | 8/2008 | Rofougaran | 375/302 |
| 2008/0205560 A1 * | 8/2008 | Rofougaran | 375/344 |
| 2008/0212707 A1 * | 9/2008 | Rofougaran | 375/269 |
| 2009/0013369 A1 * | 1/2009 | Seo et al. | 725/131 |
| 2009/0086795 A1 * | 4/2009 | Rofougaran et al. | 375/216 |
| 2009/0086796 A1 * | 4/2009 | Rofougaran | 375/219 |
| 2009/0086844 A1 * | 4/2009 | Rofougaran | 375/295 |
| 2009/0086851 A1 * | 4/2009 | Rofougaran | 375/324 |
| 2009/0124223 A1 * | 5/2009 | Kyranas et al. | 455/143 |
| 2009/0170465 A1 * | 7/2009 | Reis | 455/318 |
| 2009/0209227 A1 * | 8/2009 | Greer et al. | 455/404.2 |
| 2009/0248929 A1 * | 10/2009 | Rofougaran | 710/106 |
| 2009/0258706 A1 * | 10/2009 | Rofougaran et al. | 463/39 |

* cited by examiner

METHOD AND SYSTEM FOR UTILIZING DIRECT DIGITAL FREQUENCY SYNTHESIS TO PROCESS SIGNALS IN MULTI-BAND APPLICATIONS

CROSS-REFERENCE TO RELATED APPLICATIONS/INCORPORATION BY REFERENCE

Not Applicable

FIELD OF THE INVENTION

Certain embodiments of the invention relate to on-chip RF multi-band tuners. More specifically, certain embodiments of the invention relate to a method and system for utilizing direct digital frequency synthesis to process signals in multi-band applications

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area single frequency network (SFN). There are also significant challenges in deploying broadcast services to mobile user equipment. Because of form factor constraints, many handheld portable devices, for example, may require that PCB area be minimized and that services consume minimum power to extend battery life to a level that may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IVN) and in the US, the 1670-1675 MHz band that has been allocated for DVB-H operation. Additional spectrum is expected to be allocated in the L-band world-wide. Broadcasting frequencies for VHF channels may range between 174-240 MHZ, for example.

To meet requirements for mobile broadcasting the DVB-H specification supports time slicing to reduce power consumption at the user equipment, addition of a 4K mode to enable network operators to make tradeoffs between the advantages of the 2K mode and those of the 8K mode, and an additional level of forward error correction on multi-protocol encapsulated data-forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM).

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, typical DVB-T tuners or receivers in mobile terminals may employ super-heterodyne architectures with one or two intermediate frequency (IF) stages and direct sampling of the passband signal for digital quadrature down-conversion. Moreover, external tracking and SAW filters may generally be utilized for channel selection and image rejection. Such approaches may result in increased power consumption and high external component count, which may limit their application in handheld portable devices. As a result, the success of mobile broadcast capability of DVB-T may depend in part on the ability to develop TV tuners that have smaller form factor, are produced at lower cost, and consume less power during operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing direct digital frequency synthesis to process signals in multi-band applications substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

In applications such as DVB-H, desired frequency bands may fall within a wide range of frequencies from 170 MHz up to 1.7 GHz. Down-conversion of this wide range of frequencies generally means that the RF receiver may need to generate a wide range and large number of local oscillator frequencies. Direct digital frequency synthesizers are ideally suited for this task. Various embodiments of the invention may be found in a method and system for utilizing direct digital frequency synthesis in multi-band applications. Aspects of the invention may comprise a direct digital frequency synthesizer within a RF receiver that may generate signals of varying frequencies, which may be utilized for processing received signals.

Aspects of a method and system for utilizing, direct digital frequency synthesis in multi-band applications are provided. A direct digital frequency synthesizer integrated in a multi-band wireless receiver chip may be enabled to generate one or more reference signals that may be utilized to down-convert VHF, UHF and L-band signals to baseband signals. The direct digital frequency synthesizer may further generate one or more reference signals, which may be utilized to calibrate one or more circuits that process received VHF, UHF, and L-band signals. In this regard, the signals generated by the direct digital frequency synthesizer may be utilized to calibrate one or more LNAs in a receive processing chain of the chip and/or one or more filters that may be utilized to process baseband signals.

Figure 1A:
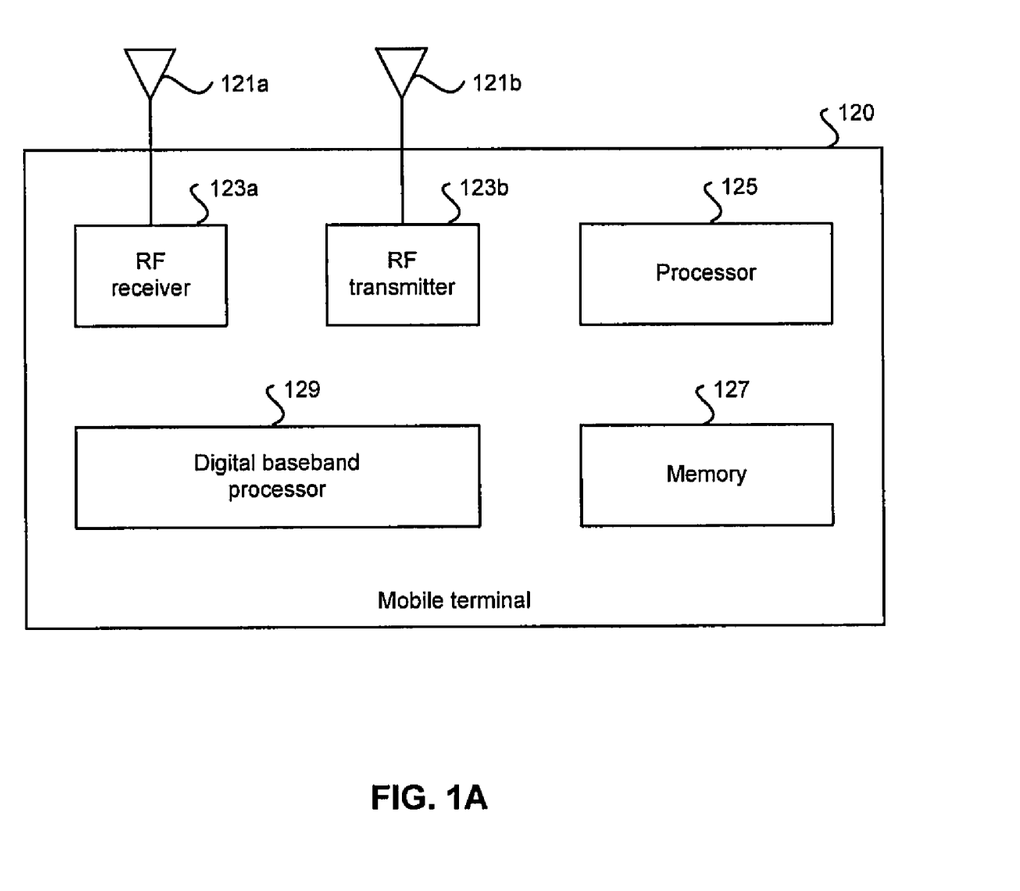
FIG. 1A is a block diagram illustrating an exemplary mobile terminal, in accordance with an embodiment of the invention.

FIG. 1A is a block diagram illustrating an exemplary mobile terminal, in accordance with an embodiment of the invention. Referring to FIG. 1A, there is shown a mobile terminal 120 that may comprise an RF receiver 123a, an RF transmitter 123b, a digital baseband processor 129, a processor 125, and a memory 127. A receive antenna 121a may be communicatively coupled to the RF receiver 123a. A transmit antenna 121b may be communicatively coupled to the RF transmitter 123b. The mobile terminal 120 may be operated in a system, such as the cellular network and/or digital video broadcast network, for example. The U.S. application Ser. No. 11/385,390 filed on Mar. 21, 2006, discloses a cellular network and/or digital video broadcast network in reference to a method and system for a multi-band direct conversion CMOS mobile cellular television tuner, and is hereby incorporated herein by reference in its entirety.

The RF receiver 123a may comprise suitable logic, circuitry, and/or code that may enable processing of received RF signals. The RF receiver 123a may enable receiving RF signals in a plurality of frequency bands. For example, the RF receiver 123a may enable receiving DVB-H transmission signals via the UHF band, from about 470 MHz to about 890 MHz, the 1670-1675 MHz band, and/or the L-band, from about 1400 MHz to about 1700 MHz, for example. Moreover, the RF receiver 123a may enable receiving signals in cellular frequency bands, for example. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the mobile terminal 120 may comprise more than one RF receiver 123a, wherein each of the RF receiver 123a may be a single-band or a multi-band receiver.

The RF receiver 123a may down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/ or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The RF transmitter 123b may enable transmission of RF signals in a plurality of frequency bands. Moreover, the RF transmitter 123b may enable transmitting signals in cellular frequency bands, for example. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the mobile terminal 120 may comprise more than one RF transmitter 123b, wherein each of the RF transmitter 123b may be a single-band or a multi-band transmitter.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123a to enable receiving DVB-H transmission in the appropriate frequency band.

Figure 1B:
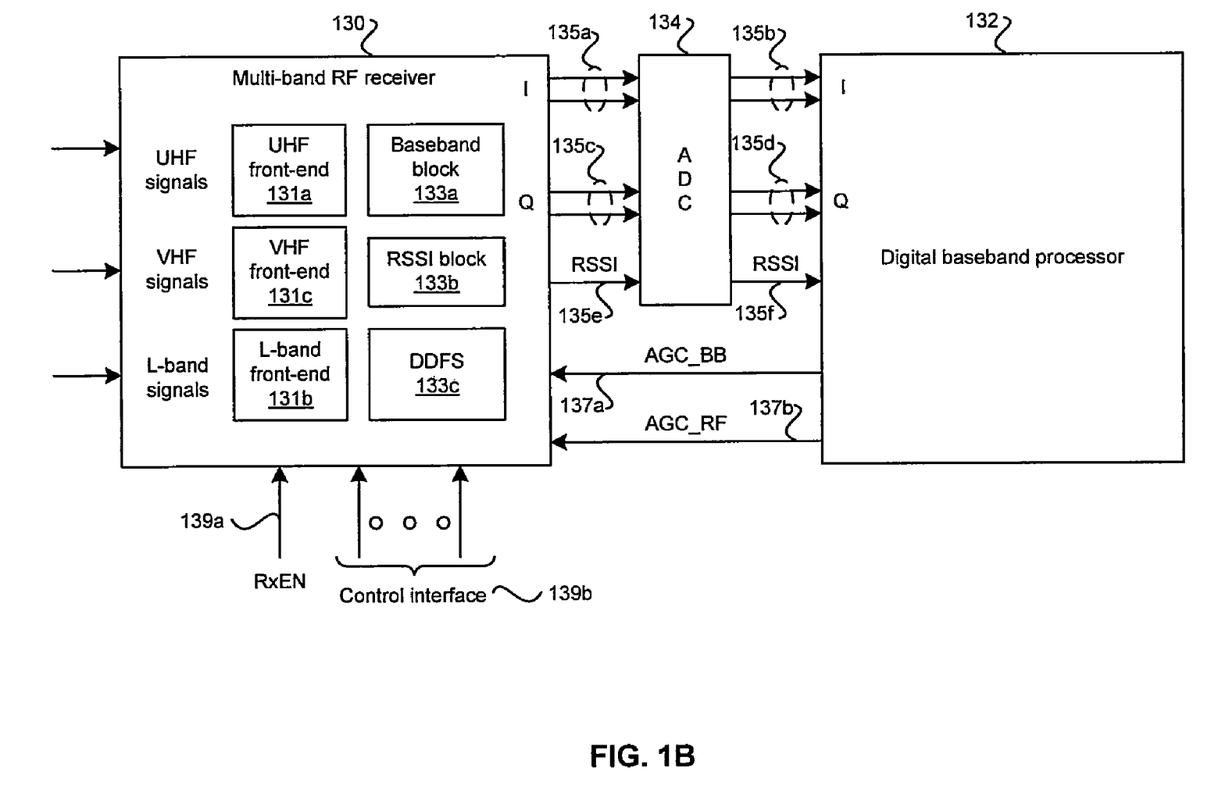
FIG. 1B is a block diagram illustrating exemplary communication between a multi-band RF receiver and a digital baseband processor in a mobile terminal, in accordance with an embodiment of the invention.

FIG. 1B is a block diagram illustrating exemplary communication between a multi-band RF receiver and a digital baseband processor in a mobile terminal, in accordance with an embodiment of the invention. Referring to FIG. 1B, there is shown a multi-band RF receiver 130, a multi-channel analog-to-digital converter (ADC) 134, and a digital baseband processor 132. The multi-band RF receiver 130 may comprise a UHF front-end 131a, an L-band front-end 131b, a VHF front-end 131c, a baseband block 133a, a received signal strength indicator (RSSI) block 133b, and a direct digital frequency synthesizer (DDFS) 133c. The multi-band RF receiver 130, the analog-to-digital converter (ADC) 134, and/or the digital baseband processor 132 may be part of a mobile terminal, such as the mobile terminal 120 in FIG. 1A, for example.

The multi-band RF receiver 130 may comprise suitable logic, circuitry, and/or code that may enable handling of UHF, VHF, and L-band signals. The multi-band RF receiver 130 may be enabled via an enable signal, such as the signal RxEN 139a, for example. In this regard, enabling the multi-band RF receiver 130 via the signal RxEN 139a by a 1:10 ON/OFF ratio may allow time slicing in DVB-H while reducing power consumption. At least a portion of the circuitry within the multi-band RF receiver 130 may be controlled via the control interface 139b. The control interface 139b may receive information from, for example, a processor, such as the processor 125 in FIG. 1A, or from the digital baseband processor 132. The control interface 139b may comprise more than one bit. For example, when implemented as a 2-bit interface, the control interface 139a may be an inter-integrated circuit (I2C) interface.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131a may communicate the resulting baseband frequency signals to the baseband block 133a for further processing.

The L-band front-end 131b may comprise suitable logic, circuitry, and/or code that may enable low noise amplification and direct down conversion of L-band signals. In this regard, the L-band front-end 131b may utilize an integrated LNA and mixers, such as passive mixers, for example. The L-band front-end 131b may communicate the resulting baseband frequency signals to the baseband block 133a for further processing.

The VHF front-end 131c may comprise suitable logic, circuitry, and/or code that may enable low noise amplification and direct down conversion of VHF signals. In this regard, the VHF front-end 131c may utilize an integrated low noise amplifier (LNA) and mixers, such as passive mixers, for example. The VHF front-end 131c may communicate the resulting baseband frequency signals to the baseband block 133a for further processing. The multi-band RF receiver 130 may enable one of the UHF front-end 131a, the L-band front-end 131b, and the VHF front-end 131c based on current communication conditions.

The direct digital frequency synthesizer (DDFS) 133c may comprise suitable logic, circuitry, and/or code that may enable generating the appropriate local oscillator (LO) signals for performing direct down conversion in the UHF front-end 131a, the L-band front-end 131b, or the VHF front-end 131c. Since the DDFS 133c may generate almost any LO frequency, from near DC to near half the frequency of a reference clock, a large range of crystal oscillators may be utilized as a frequency source for the synthesizer 133c. This approach may enable the use of an existing crystal oscillator in a mobile terminal PCB, thus reducing the number of external components necessary to support the operations of the multi-band RF receiver 130, for example. The DDFS 133c may generate LO signals for the UHF front-end 131a, the L-band front-end 131b, and the VHF front-end 131c.

In this regard, the UHF front-end 131a, the L-band front-end 131b, and the VHF front-end 131c may not enable dividing the LO signal in order to generate the appropriate signal to perform down conversion from the UHF band, the L-band, and the VHF band respectively.

The baseband block 133a may comprise suitable logic, circuitry, and/or code that may enable processing of I/Q components generated from the direct down conversion operations in the UHF front-end 131a, L-band front-end 131b, and the VHF front-end 131c. The baseband block 133a may enable amplification and/or filtering of the I/Q components in analog form. The baseband block 133a may communicate the processed I component, that is, signal 135a, and the processed Q component, that is, signal 135c, to the multi-channel ADC 134 for digital conversion.

The RSSI block 133b may comprise suitable logic, circuitry, and/or code that may enable measuring the strength, that is, the RSSI value, of a received RF signal, whether UHF, L-band, or VHF signal. The RSSI block 133b may be implemented based on a logarithmic amplifier, for example. The RSSI measurement may be performed, for example, after the received RF signal is amplified in the UHF front-end 131a, the L-band front-end 131b, or the VHF front-end 131c. The RSSI block 133b may communicate the analog RSSI measurement, signal 135e, to the multi-channel ADC 134 for digital conversion.

The multi-channel ADC 134 may comprise suitable logic, circuitry, and/or code that may enable digital conversion of signals 135a, 135c, and/or 135e to signals 135b, 135d, and/or 135f respectively. In some instances, the multi-channel ADC 134 may be integrated into the multi-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 1A. The digital baseband processor 132 may enable generating at least one signal, such as the signals AGC_BB 137a and AGC_RF 137b, for adjusting the operations of the multi-band RF receiver 130. For example, the signal AGC_BB 137a may be utilized to adjust the gain provided by the baseband block 133a on the baseband frequency signals generated from the UHF front-end 131a, the L-band front-end 131b, or the VHF front-end 131c. In another example, the signal AGC_RF 137b may be utilized to adjust the gain provided by an integrated LNA in the UHF front-end 131a, the L-band front-end 131b, or the VHF front-end 131c. In this regard, the signal AGC_RF 137b may be utilized to adjust the gain during a calibration mode, for example. In another example, the digital baseband processor 132 may generate at least one control signal or control information communicated to the multi-band RF receiver 130 via the control interface 139b for adjusting operations within the multi-band RF receiver 130.

Figure 1C:
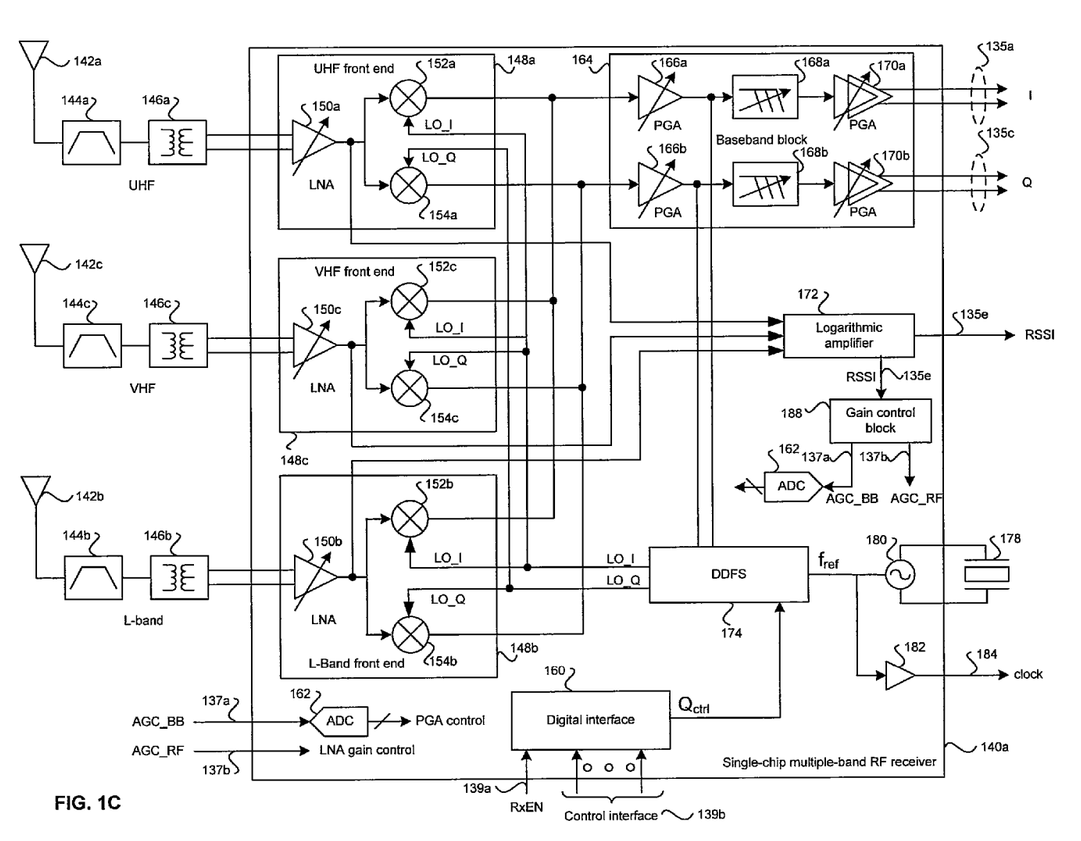
FIG. 1C is a block diagram illustrating an exemplary single-chip multi-band RF receiver with on-chip gain control processing, in accordance with an embodiment of the invention.

FIG. 1C is a block diagram illustrating an exemplary single-chip multi-band RF receiver with an integrated LNA in each front-end, in accordance with an embodiment of the invention. Referring to FIG. 1C, there is shown a single-chip multi-band RF receiver 140a that may comprise a UHF front-end 148a, an L-band front-end 148b, a VHF front-end 148c, a baseband block 164, a logarithmic amplifier 172, a digital frequency synthesizer 174, a digital interface 160, an ADC 162, an oscillator 180, and a buffer 182.

The single-chip multi-band RF receiver 140a may be fabricated using any of a plurality of semiconductor manufacturing processes, for example, complementary metal-oxide-semiconductor (CMOS) processes, bipolar CMOS (BiCMOS), or Silicon Germanium (SiGe). The single-chip multi-band RF receiver 140a may be implemented using differential structures to minimize noise effects and/or substrate coupling, for example. The single-chip multi-band RF receiver 140a may utilize low drop out (LDO) voltage regulators to regulate and clean up on-chip voltage supplies. In this regard, the LDO voltage regulators may be utilized to transform external voltage sources to the appropriate on-chip voltages.

When the single-chip multi-band RF receiver 140a is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip multi-band RF receiver 140a may receive UHF signals via a first antenna 142a, a UHF filter 144a, and a first balun 146a. The UHF filter 144a enables band pass filtering, wherein the band pass may be about 470 to about 702 MHz for cellular signals, for example, or about 470 to about 862 MHz, for other types of received signals, for example. The balun 146a enables balancing the filtered signals before being communicated to the UHF front-end 148a.

The single-chip multi-band RF receiver 140a may receive L-band signals via a second antenna 142b, an L-band filter 144b, and a second balun 146b. The L-band filter 144b enables band pass filtering, wherein the band pass may be about 1670 to about 1675 MHz for signals in US systems, for example, or about 1450 to about 1490 MHz, for signals in European systems, for example. The balun 146b enables balancing the filtered signals before being communicated to the L-band front-end 148a.

The single-chip multi-band RF receiver 140a may receive VHF signals via a third antenna 142c, a VHF filter 144c, and a third balun 146c. The VHF filter 144c enables band pass filtering, wherein the band pass may be about 174 to about 240 MHz for signals in US systems, for example. The balun 146c enables balancing the filtered signals before being communicated to the VHF front-end 148c. In some instances, antennas 142a, 142b and 142c may be implemented utilizing a single antenna communicatively coupled to the single-chip multi-band RF receiver 140a that may support receiving radio signals operating in the UHF, L-band, and/or VHF frequencies, for example.

The UHF front-end 148a may comprise a variable gain low noise amplifier (LNA) 150a, a mixer 152a, and a mixer 154a. The variable gain LNA 150a may comprise suitable logic and/or circuitry that may enable amplification of the UHF signals received. Matching between the output of the balun 146a and the input of the variable gain LNA 150a may be achieved by utilizing off-chip series inductors, for example. The variable gain LNA 150a may implement continuous gain control by current steering that may be controlled by a replica scheme within the variable gain LNA 150a. The gain of the variable gain LNA 150a may be adjusted via the signal AGC_RF 137b, for example. In this regard, the gain of the variable gain LNA 150a may be adjusted during a calibration mode for each selected desired channel of operation within the frequency range provided by the UHF front-end 148a, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature LO signals generated by the DDFS block 174. The mixers 152a and 154a may be passive mixers in order to achieve high linearity and/or low flicker noise, for example. The I/Q components generated by the mixers 152a and 154a may be communicated to the baseband block 164.

The L-band front-end 148b may comprise a variable gain LNA 150b, a mixer 152a, and a mixer 154a. The variable gain LNA 150a may comprise suitable logic and/or circuitry that may enable amplification of the L-band signals received. Matching between the output of the balun 146b and the input of the variable gain LNA 150b may be achieved by utilizing off-chip series inductors, for example. The variable gain LNA 150b may implement continuous gain control by current steering that may be controlled by a replica scheme within the variable gain LNA 150b. The gain of the variable gain LNA 150b may be adjusted via the signal AGC_RF 137b, for example. In this regard, the gain of the variable gain LNA 150b may be adjusted during a calibration mode for each selected desired channel of operation within the frequency range provided by the L-band front-end 148b, for example.

The mixers 152b and 154b may comprise suitable logic and/or circuitry that may enable generating I/Q components of the baseband frequency signal based on the direct down conversion of the amplified received L-band signal with the quadrature LO signals. The mixers 152b and 154b may be passive mixers in order to achieve high linearity and/or low flicker noise, for example. The I/Q components generated by the mixers 152b and 154b may be communicated to the baseband block 164.

The VHF front-end 148c may comprise a variable gain LNA 150c, a mixer 152c, and a mixer 154c. The variable gain LNA 150c may comprise suitable logic and/or circuitry that may enable amplification of the VHF signals received. Matching between the output of the balun 146c and the input of the variable gain LNA 150c may be achieved by utilizing off-chip series inductors, for example. The variable gain LNA 150c may implement continuous gain control by current steering that may be controlled by a replica scheme within the variable gain LNA 150c. The gain of the variable gain LNA 150c may be adjusted via the signal AGC_RF 137b, for example. In this regard, the gain of the variable gain LNA 150c may be adjusted during a calibration mode for each selected desired channel of operation within the frequency range provided by the VHF front-end 148c, for example.

The mixers 152c and 154c may comprise suitable logic and/or circuitry that may enable generating in-phase (I) and quadrature (Q) components of the baseband frequency signal based on direct down conversion of the amplified received VHF signal with the quadrature LO signals. The mixers 152c and 154c may be passive mixers in order to achieve high linearity and/or low flicker noise, for example. The I/Q components generated by the mixers 152c and 154c may be communicated to the baseband block 164.

The logarithmic amplifier 172 may comprise suitable logic, circuitry, and/or code that may enable generation of a wideband, received signal strength indicator (RSSI) signal, such as the signal 135e, based on the output of the variable gain LNA 150a, the variable gain LNA 150b, or the variable gain LNA 150c, for example. The RSSI signal indicates the total amount of signal power that is present at the output of the LNA, for example. The RSSI signal may be utilized by, for example, the digital baseband processor 132 in FIG. 1B, to adjust the gain of a variable gain LNA in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals.

This effect may be a result of blockers generating large signals within the receiver path. These large signals may introduce harmonics, intermodulation products, and/or unwanted mixing products that crosstalk with the wanted signals.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip multi-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct value required to meet the requirements of the communications standard for which the receiver is designed. For DVB-T/DVB-H, the value $f_o$ of the filter response may be set to a value from 2.5 to 4 MHz thus supporting the different channel bandwidths of 5-8 MHz specified by DVB-T/DVB-H standards. During auto-calibration, a tone at the appropriate $f_{-3dB}$ may be generated on-chip and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The direct digital frequency synthesizer (DDFS) 174 may comprise suitable logic, circuitry, and/or code that may enable generation of quadrature LO signals, LO_I and LO_Q, and one or more reference signals utilized by the baseband block 164. Signals generated by DDFS block 174 may be independent of the reference crystal frequency, such as the crystal 178, for example. Since the direct digital frequency synthesizer 174 may generate frequencies from near DC to near half a reference clock frequency, the single-chip multi-band RF receiver 140a may utilize the same crystal utilized by other operations in the mobile terminal while maintaining fine tuning capability. The DDFS 174 may receive a reference frequency signal from the crystal 178 via an oscillator 180, for example. The output of the oscillator 180 may also be buffered by the buffer 182 to generate a clock signal 184, for example.

The DDFS 174 may also be utilized to generate a signal, such as a tone, for example, to calibrate the integrated LNAs in the UHF front-end 148a, the L-band front-end 148b, or the VHF front-end 148c, when a new desired channel is selected for operation. In this regard, the synthesizer 174 may generate a signal with a frequency that corresponds to the desired channel that is selected. The ability of the DDFS 174 to provide fine tuning capabilities enables the generation of the appropriate signal frequency for a large range of desired channels in the operation of the single-chip multi-band RF receiver 140a.

The digital interface 160 may comprise suitable logic, circuitry, and/or code that may enable controlling circuitry within the single-chip multi-band RF receiver 140a. The digital interface 160 may comprise a plurality of registers for storing control and/or operational information for use by the single-chip multi-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 1A, or from the digital baseband processor 132 in FIG. 1B. The control interface 139b may comprise more than one bit. The control interface 139b may be utilized to control the operations of the direct digital frequency synthesizer 174 and/or the filtering operations of the baseband filters 168a and 168b. The control interface 139b may also be utilized to adjust the bias of circuits within the single-chip multi-band RF receiver 140a, such as those of the variable gain LNAs 150a, 150b, and 150c the PGAs 166a, 166b, 170a, and 170b, and/or the baseband filters 168a and 168b, for example.

A gain control block 186 may be integrated into the single-chip multi-band RF receiver 140b. The gain control block 186 may comprise suitable logic, circuitry, and/or code that may enable on-chip gain adjustment for the variable gain LNAs 150a, 150b, and 150c and for the PGAs 166a, 166b, 170a, and 170b. In this regard, the gain control block 186 may receive the RSSI signal 135e and may generate the signals AGC_BB 137a and AGC_RF 137b, for example.

Figure 2:
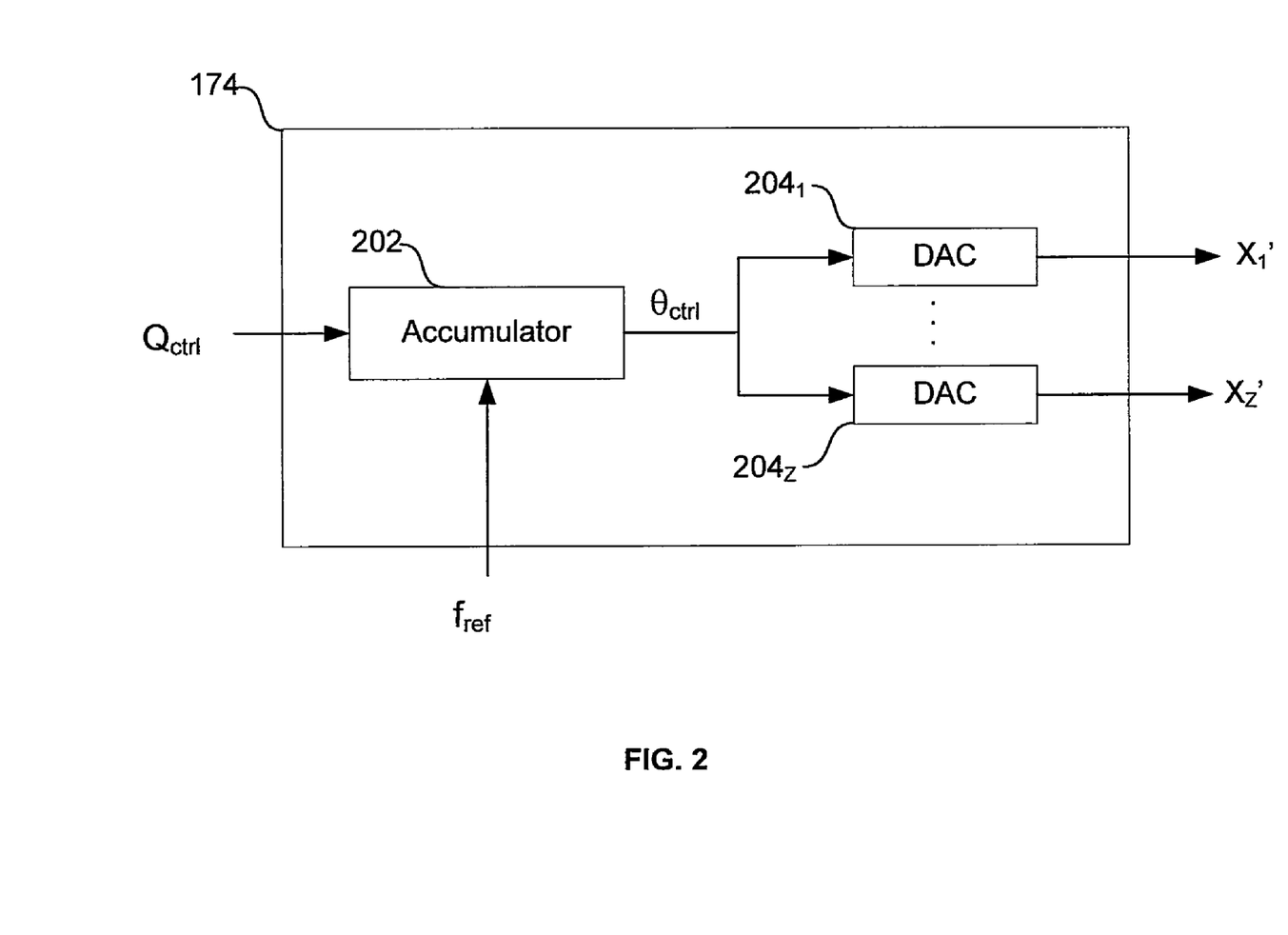
FIG. 2 is a block diagram of a direct digital frequency synthesizer in connection with an embodiment of the invention

FIG. 2 is a block diagram of a direct digital frequency synthesizer in accordance with an embodiment of the invention. In one embodiment, DDFS block 302 may comprise an accumulator 402 and one or more digital to analog conversion (DAC) blocks $204i_{1...Z}$.

Referring to FIG. 2, the accumulator block 202 may comprise suitable logic, circuitry, and/or code to enable successively adding $Q_{ctrl}$ to a value stored in the accumulator on each cycle of a reference clock. In one embodiment, the accumulator may be controlled via the control interface 139b, and may also receive a signal, $f_{ref}$, from a clock, such as oscillator 180 shown in FIG. 1C. In this regard, the processor and the reference clock can determine phase and frequency of output signals $X'_{1...Z}$. Referring to FIG. 2, the DAC blocks $204_1, \ldots, 204_Z$ may comprise suitable logic, circuitry, and and/or code that may enable output of one or more signals of varying phase, frequency, or amplitude. In one embodiment, the DAC blocks $201_1, \ldots, 201_Z$ may comprise a number of lookup tables used to generate output signals which drive one or more power mixers, such as mixers 152 or 154 shown in FIG. 1C. In this regard, the DAC blocks may be controlled via the control interface 139b.

In operation, the DDFS block 174 is a digitally-controlled signal generator that may vary phase, frequency, and amplitude of one or more output signals based on a single fixed-frequency reference clock of frequency $f_{ref}$, and a control word $Q_{ctrl}$. In operation, the control word $Q_{ctrl}$ may be provided to the accumulator 202, and may be successively added to a value stored in the accumulator on each cycle of the reference clock. In this manner, the sum will eventually be greater than the maximum value the accumulator can store, and the value in the accumulator may overflow or "wrap". Accordingly, an N-bit accumulator will overflow at a frequency $f_{ddfs}$ given by EQ. 1.

$$f_{ddfs} = f_{ref}(Q_{ctrl}/2^N) \qquad \text{EQ.1}$$

In this manner, the output of the accumulator, $\theta_{ctrl}$, will be periodic with period $1/f_{ddfs}$ and may represent the phase angle of a signal. In this regard, the DDFS is well suited as a frequency generator that outputs one or more sine waves or other periodic waveforms over a large range of frequencies, from almost DC to approximately half the reference clock frequency $f_{ref}$.

Aspects of the invention may be found in a method and system for processing signals in a multi-band wireless receiver chip, such as the receiver chip 130 shown in FIG. 1B, utilizing reference signals generated on chip by one or more direct digital frequency synthesizers (DDFS) such as DDFS 133c. In this manner, a single DDFS 133c may be utilized for all receive frequency bands or each band may have a dedicated DDFS. Additionally, to generate the reference signals, the DDFS, such as the DDFS 133c may be enabled to receive a control word, such as the $Q_{ctrl}$, and may be driven by a reference clock signal, such as $f_{ref}$ provided by the oscillator 180 disclosed in FIG. 1C. In this regard, the reference clock $f_{ref}$ driving the DDFS may operate at a single, fixed frequency.

The processing of the received VHF, UHF, and L-band may involve down-converting to baseband, signals received in the VHF, UHF, and L-band frequency bands. In this regard, generated reference signals may comprise one or more tones and may be local oscillator signals which are 90° out of phase with each other, such as LO_I and LO_Q in FIG. 1C. Additionally, the generated reference signals may comprise signals utilized for de-modulating baseband signals that result from the down conversion of the VHF, UHF, and L-band signals.

The processing of the received VHF, UHF, and L-band signals may also involve calibrating one or more circuits utilized in the processing of the received signals. In this regard, a DDFS, such as the DDFS 174, may generate one or more tones which may be within the selected VHF, UHF, or L-band channel and may be utilized to calibrate one or more low noise amplifiers (LNA) such as the LNAs 150a . . . , 150c disclosed in FIG. 1C. The DDFS 174 may also generate one or more signals for calibrating one or more baseband filter circuits, such as filters 168a and 168b in FIG. 1C, that may filter the down-converted signals corresponding to received VHF, UHF, and L-band signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing wireless signals, the method comprising:
   performing a calibration of a multi-band wireless receiver chip upon power up of said multi-band wireless receiver chip, wherein said calibration comprises generating, via a direct digital frequency synthesizer in said multi-band wireless receiver chip, one or more calibration signals, each calibration signal having a frequency corresponding to the frequency of a channel over which said multi-band wireless receiver chip is to receive signals, said calibration further comprising applying said one or more calibration signals directly to an input of at least one baseband filter to calibrate said at least one baseband filter; and
   subsequent to said calibration, generating, within a multi-band wireless receiver chip, a plurality of reference signals that are utilized for downconverting, within said multi-band wireless receiver chip, received VHF signals, received UHF signals and received L-band signals to corresponding baseband signals, wherein said plurality of reference signals are generated via said direct digital frequency synthesizer that comprises an accumulator having an output that is coupled to one or more digital-to-analog converters.

2. The method according to claim 1, wherein said one or more calibration signals are utilized to calibrate one or more circuits that process one or more of: said received VHF signals, said received UHF signals, and said received L-band signals.

3. The method according to claim 2, wherein said one or more circuits calibrated via said one or more calibration signals generated by said direct digital frequency synthesizer comprise at least one amplifier in a receive chain that is utilized for processing one or more of: said received VHF signals, said received UI-IF signals, and said received L-band signals.

4. The method according to claim 2, wherein said one or more circuits calibrated via said one or more calibration signals generated by said direct digital frequency synthesizer comprise at least one filter that is utilized for processing baseband signals corresponding to one or more of: said received VHF signals, said received UHF signals, and said received L-band signals.

5. The method according to claim 2, wherein each of said one or more calibration signals comprise one or more tones.

6. The method according to claim 1, wherein said signal that is utilized to calibrate said one or more circuits comprises a frequency that corresponds to a selected channel associated with said one or more of: said received VHF signals, said received UHF signals, and said received L-band signals.

7. The method according to claim 1, comprising utilizing said direct digital frequency synthesizer for processing each of said received VHF signals, said received UHF signals, and said received L-band signals.

8. The method according to claim 1, comprising driving said direct digital frequency synthesizer utilizing a single reference clock.

9. The method according to claim 1, comprising driving said direct digital frequency synthesizer utilizing a single fixed-frequency reference clock.

10. The method according to claim 1, comprising generating one or more pairs of reference signals, wherein each pair of reference signals comprises signals that are 90° out of phase with each other, utilizing said direct digital frequency synthesizer.

11. The method according to claim 10, comprising downconverting within said multi-band wireless receiver chip, said received VHF signals, said received UHF signals; and said received L-band signals utilizing said generated one or more pairs of reference signals, wherein each pair of reference signals comprises signals that are 90° out of phase with each other.

12. The method according to claim 11 comprising demodulating within said multi-band wireless receiver chip, said down-converted received VHF signals, received UHF signals, and received L-band signals utilizing one or more signals generated via said direct digital frequency synthesizer.

13. A system for processing wireless signals, the system comprising: one or more circuits for use in a multi-band wireless receiver chip, said one or more circuits comprising one or more direct digital frequency synthesizers, wherein:
   said one or more direct digital frequency synthesizers are operable to perform a calibration of said multi-band wireless receiver chip upon power up of said multi-band wireless receiver chip;
   said one or more direct digital frequency synthesizers are operable to generate one or more calibration signals during said calibration, each calibration signal having a frequency corresponding to the frequency of a channel over which said multi-band wireless receiver chip is to receive signals;
   said one or more direct digital frequency synthesizers applying said one or more calibration signals directly to an input of at least one baseband filter to calibrate said at least one baseband filter during said calibration;
   subsequent to said calibration, said one or more direct digital frequency synthesizers are operable to generate a plurality of reference signals that are utilized for downconverting, within said multi-band wireless receiver chip, received VHF signals, received UHF signals and received L-band signals; and
   each of said direct digital frequency synthesizers comprises an accumulator having an output that is coupled to one or more digital-to-analog converters.

14. The system according to claim 13, wherein said one or more calibration signals are utilized to calibrate a portion of said one or more circuits that processes one or more of: said received VHF signals, said received UHF signals, and said received L-band signals.

15. The system according to claim 14, wherein said portion of said one or more circuits comprises at least one amplifier in a receive chain that is utilized for processing one or more of: said received VHF signals, said received UHF signals, and said received L-band signals.

16. The system according to claim 14, wherein:
said portion of said one or more circuits comprises at least one filter that is utilized for processing baseband signals corresponding to one or more of: said received VHF signals, said received UHF signals, and said received L-band signals.

17. The system according to claim 14, wherein each of said one or more calibration signals comprise one or more tones.

18. The system according to claim 14, wherein a frequency of said one or more calibration signals corresponds to a frequency of a selected channel associated with said one or more of: said received VHF signals, said received UHF signals, and said received L-band signals.

19. The system according to claim 13, wherein said one or more direct digital frequency synthesizers is utilized for processing each of said received VHF signals, said received UHF signals, and said received L-band signals.

20. The system according to claim 13, wherein said one or more circuits comprise a single reference clock for driving said one or more direct digital frequency synthesizers.

21. The system according to claim 13, wherein said one or more circuits comprise a single fixed-frequency reference clock for driving said one or more direct digital frequency synthesizers.

22. The system according to claim 13, wherein said one or more digital frequency synthesizers generates one or more pairs of reference signals, wherein each pair of reference signals comprises signals that are 90° out of phase with each other, utilizing said one or more direct digital frequency synthesizers.

23. The system according to claim 22, wherein said one or more digital frequency synthesizers enables down-conversion of, within said multi-band wireless receiver chip, said received VHF signals, said received UHF signals, and said received L-band signals utilizing said generated one or more pairs of reference signals, wherein each pair of reference signals comprises signals that are 90° out of phase with each other.

24. The system according to claim 23, wherein said one or more digital frequency synthesizers generates one or more signals for de-modulating within said multi-band wireless receiver chip, said down-converted received VHF signals, said down-converted received UHF signals, and said down-converted received L-band signals.

* * * * *

UNITED STATES PATENT AND TRADEMARK OFFICE
CERTIFICATE OF CORRECTION

Page 1 of 1

PATENT NO.       : 8,284,822 B2
APPLICATION NO.  : 11/679626
DATED            : October 9, 2012
INVENTOR(S)      : Ahmadreza Rofougaran It is certified that error appears in the above-identified patent and that said Letters Patent is hereby corrected as shown below:

In the Claims

Column 13, line 52, "UI-IF" should be changed to --UHF--.

Signed and Sealed this
Eighteenth Day of February, 2014

Michelle K. Lee
*Deputy Director of the United States Patent and Trademark Office*